M. G. EWER.
WRENCH.
APPLICATION FILED JUNE 28, 1909.
967,355.
Patented Aug. 16, 1910.
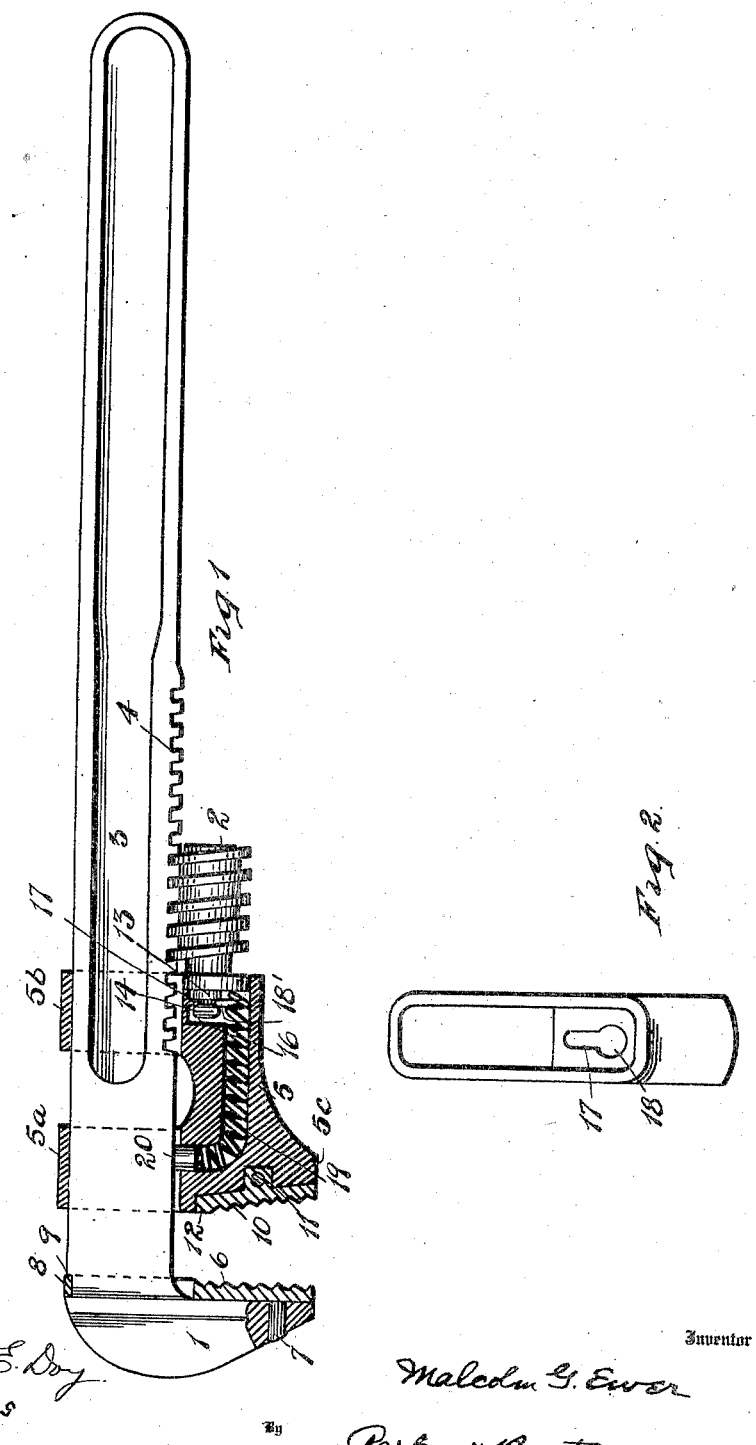
Witnesses
Clarence E. Doy
C. A. Jennings
Inventor
Malcolm G. Ewer
By Parker & Burton
Attorneys

UNITED STATES PATENT OFFICE.

MALCOLM G. EWER, OF DETROIT, MICHIGAN.

WRENCH.

967,355.  Specification of Letters Patent.  Patented Aug. 16, 1910.

Application filed June 28, 1909.  Serial No. 504,686.

*To all whom it may concern:*

Be it known that I, MALCOLM G. EWER, citizen of the United States, residing at Detroit, county of Wayne, State of Michigan, have invented a certain new and useful Improvement in Wrenches, and declare the following to be a full, clear, and exact description of the same, such as will enable others skilled in the art to which it pertains to make and use the same, reference being had to the accompanying drawings, which form a part of this specification.

This invention relates to wrenches.

It has for its object attachments adapted to be used in connection with that class of wrenches in which the movement of the movable jaw is controlled by means of a swinging screw that swings into engagement with the rack on the bar of the fixed jaw when it is desired to hold the jaw rigidly in position, that turns with respect to the movable jaw to produce a final adjustment of the opening between the jaws and that swings out of engagement with the rack to enable the workmen to make a quick change in the opening between the jaws.

In the drawings:—Figure 1, is a side elevation partly in section. Fig. 2, is an end elevation of the movable jaw.

The end of the movable jaw shown in Fig. 2 is that end with which the screw 2, Fig. 1 engages.

The fixed jaw 1 is provided with a shank 3 made integral therewith; this shank is provided with a rack 4 with which the adjusting screw 2 engages. The movable jaw 5 is provided with an eye that slides on the shank 3 and with the jaw portion projecting from that face of the shank along which the rack is cut. Preferably two straps 5$^a$ and 5$^b$ engage around the shank and are made integral with the jaw portion 5$^c$. A removable facing 6 of hardened steel is inserted on the inner or gripping face of the jaw 1. This removable facing 6 is only intended to be removed when it has been worn or injured, and is secured to the fixed jaw by means of a rivet 7 that is made preferably integral as a part of the hardened facing 6, acting in conjunction with a ring or band 8 that extends around the shank of the fixed jaw just at the neck connection between it and the head. The strap 8 engages in a notch 9 which allows the outer surface of the strap to sink until it is flush with the back line of the shank. In this position the rivet engages through a hole made for the purpose of such engagement in the head 1 and the rivet is headed down and the facing becomes so attached to the head that it may be considered permanent and is permanent except that it may be removed for renewal. A similar hardened facing 10 is set into the slide jaw 5. This hardened facing is provided with a short tang 11 and with a rivet hole through the tang arranged to register with rivet holes in the head 5; this facing also is secured by a rivet; the bearing pressure is at the abutting end 12 of the facing 10 which abuts against a shoulder on the movable jaw 5. The quick adjustment of the movable head on the shank of the fixed jaw is made by means of screw 2 which is provided with an extension neck 13 terminating with a head 14; the head is larger than the neck immediately behind it but of the same diameter as the main part of the projection which it terminates. The head 14 engages in a seat 16 behind the cheeks 17 of a socket that is made in the movable jaw. The head 14 can pass through the lower part 18 of the key-hole-like slot and the cheeks 17 prevent the head from escaping from position. A washer 18′ engages around the neck between the screw body 2 and the head 14 and a spring 19 is inserted in a curved hole in the movable jaw. The curved spring 19 bears against the shank 3 preferably with an interposed pin 20 and bears against the washer 18′. It tends to pull the jaw down to bring the strap 5$^a$ into engagement with the shank and tends to swing the free end of the screw 2 into engagement relation with the rack, which latter is forced out of its engagement manually when the position of the movable jaw is changed. The operation of the wrench with an object interposed between the jaws tends to push the strap 5$^a$ away from the shank causing the jaw to swing slightly from its normal position of slight obliquity with respect to the hardened facing 6 of the fixed jaw 1 to a position of approximate parallelism therewith, which, for purposes of seizure of the interposed object, is the position of greatest efficiency, and thus increases its gripping engagement with the interposed object; upon releasing the strain the jaw releases its grip and the spring draws the jaw back and brings the strap 5$^a$ into contact with the back of the shank.

It is, of course, obvious that while, for convenience and nicety of finish, the pin 20 is carried on the end of the spring as an interposed member between it and the adjacent lateral face of the shank 3, the spring 19 alone may be used without this pin, without departing from the spirit of my invention.

What I claim is:—

1. In a wrench, in combination with a shank having a notched lateral face and a bent over end portion having a serrated nut-engaging face, a movable jaw slidable therealong, an adjusting screw swiveled to one end of the movable jaw and adapted to engage the adjacent notched edge of the shank, and a spring member, having a headed end, within said movable jaw, one end of said spring engaging against said screw, whereby it is yieldingly held in engagement with the notched face of the shank, and the headed end of the spring engaging against the adjacent face of the shank to normally hold one end of the movable jaw from contact therewith, with its serrated nut-engaging face in a position of non-parallelism with the nut-engaging face of the shank, and being adapted to be swung to a position of substantial parallelism therewith when forced, against the resiliency of the spring, against the shank, substantially as described.

2. In a wrench, in combination with a fixed jaw having an integral shank portion, a movable jaw whose band portions slidably engage thereover, an adjusting screw swiveled to said movable jaw and normally engaging a toothed face of said shank portion, and a spiral spring within said movable jaw member, engaging with one end against a shoulder of said adjusting screw, whereby it is yieldingly held in engagement with the shank portion, and engaging with its headed end against said shank portion, whereby the opposite end of the jaw from that to which the adjusting screw is attached is normally held away from contact with the shank, in position to rock slightly with respect thereto and to the fixed jaw when forced into engagement therewith against the pressure of the spring, substantially as described.

3. A wrench, having, in combination with a shank portion having an integral jaw portion at one end, a movable jaw member capable of sliding movement along the shank portion, an adjusting screw having a swivel connection therewith, and a spiral spring held in a state of compression between said adjusting screw and the shank, whereby the parts are primarily held in position to be rocked, against the pressure of the spring, into position of greatest efficiency when the wrench is operated, substantially as described.

4. In a wrench, in combination with a fixed jaw portion having a laterally toothed shank portion integral therewith, a movable jaw having an operatively attached adjusting screw in engagement therewith, and a spring member within said movable jaw, engaging with one end against said adjusting screw to yieldingly hold the same in engagement with the toothed portion of the shank, and exerting pressure with the other end upon said shank portion, whereby that end of the movable jaw lying nearest to the fixed jaw portion is normally held slightly spaced from the shank and slightly out of parallel position with respect to the fixed jaw, said movable jaw being adapted to be brought into contact with said shank and into position of approximate parallelism with the fixed jaw against the pressure of said spring, substantially as described.

In testimony whereof, I sign this specification in the presence of two witnesses.

MALCOLM G. EWER.

Witnesses:
CHARLES F. BURTON,
VIRGINIA C. SPRATT.